United States Patent

[11] 3,576,438

| [72] | Inventor | Roger F. W. Pease |
| | | Holmdel, N.J. |
| [21] | Appl. No. | 819,614 |
| [22] | Filed | Apr. 28, 1969 |
| [45] | Patented | Apr. 27, 1971 |
| [73] | Assignee | Bell Telephone Laboratories, Incorporated |
| | | Murray Hill, Berkeley Heights, N.J. |

[54] FOCUS MONITOR FOR ELECTRON MICROSCOPE INCLUDING AN AUXILIARY ELECTRON GUN AND FOCUSING LENS
10 Claims, 1 Drawing Fig.

| [52] | U.S. Cl. | 250/49.5, 219/121 |
| [51] | Int. Cl. | H01j 37/26 |
| [50] | Field of Search | 250/49.5 (0), (1), (3), (4); 219/121 (EB) |

[56] References Cited
UNITED STATES PATENTS

| 3,158,733 | 11/1964 | Sibley | 250/49.5(0) |
| 3,479,504 | 11/1969 | Hull | 250/41.9(3) |
| 3,504,176 | 3/1970 | Thon | 250/49.5(4) |

*Primary Examiner*—James W. Lawrence
*Assistant Examiner*—A. L. Birch
*Attorneys*—R. J. Guenther and Edwin B. Cave ABSTRACT: The focus of an electron microscope is monitored and stabilized by measuring variations in the focal length of an analyzing lens energized by the same current as the microscope objective lens and utilizing the resulting signal to control either the objective lens current or the electron source voltage.

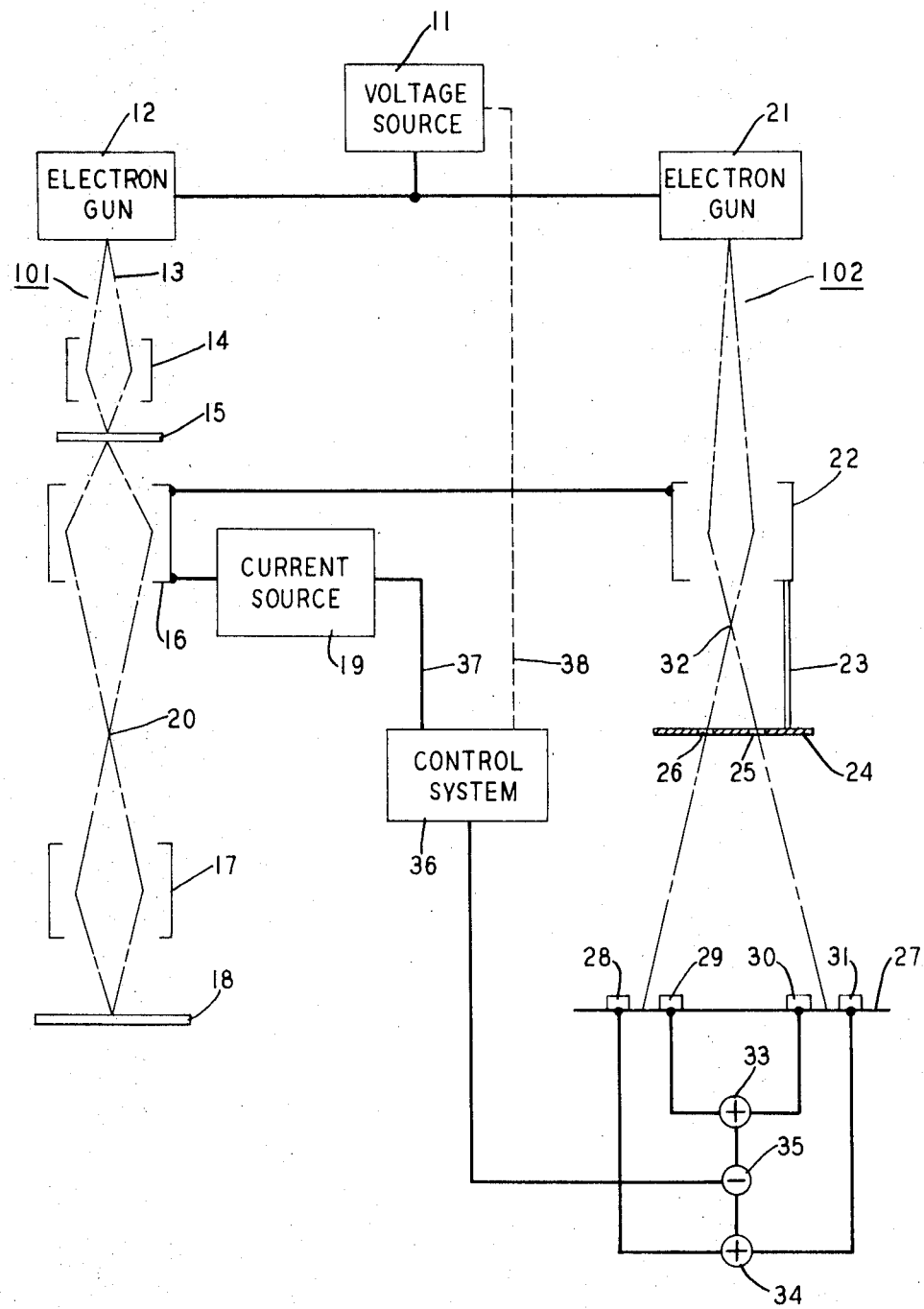

FOCUS MONITOR FOR ELECTRON MICROSCOPE INCLUDING AN AUXILIARY ELECTRON GUN AND FOCUSING LENS

BACKGROUND OF THE INVENTION

1. Field of the Invention

This invention relates to electron microscopes and more particularly to means for monitoring and stabilizing the focus of electron microscopes.

2. Description of the Prior Art

The focal length of an electron microscope depends upon the electron energy or electron source voltage and the objective lens current. Consequently, any change or instability in the electron source voltage or objective lens current will result in a change or instability in the focal length of the electron microscope. This instability in focal length or defocus reduces the sharpness of detail in the image, i.e., produces a dull image. For high resolution work a complete loss of the desired detail may result.

Present day electron microscopes attempt to achieve focus stability by separately stabilizing both the voltage and current supplies. It is difficult and quite expensive to obtain independent stabilities of the voltage and current supplies which will result in stability of the electron microscope focus better than about 1 part in $10^4$. This is unsatisfactory for high resolution work requiring focus stabilities on the order of 1 part in $10^6$. In addition, it is difficult to determine the direction and degree of defocus, as may be required for phase contrast work, when attempts are made to stabilize the voltage and current separately.

These attempts to achieve focus stability by stabilizing both the voltage and current are unnecessary because only the focal length or focus itself needs to be stabilized.

Accordingly, one object of the invention is to simplify the means for achieving focus stability in an electron microscope.

Another object is to improve the focus stability to a level sufficient for high resolution work.

SUMMARY OF THE INVENTION

The foregoing objects and others are achieved in accordance with the invention by a focus analyzer or monitor which continuously monitors variations in the focal length of the electron microscope and feeds back the resulting signal to make compensating changes in either the electron source voltage, the objective lens current, or both. A key aspect of the invention involves the use of an analyzing lens matched with the objective lens of the electron microscope and connected in series therewith. Any change in focal length of the electron microscope objective lens is accompanied by a like change in the focal length of the matched analyzing lens of the focus analyzer. This change in focal length results in a change in magnification of a point projection target which is detected by a diode detector. The diode detector signal is then used by a control system to make compensating changes in either the electron source voltage, objective lens current, or both, of the electron microscope to restore the original focal length.

BRIEF DESCRIPTION OF THE DRAWING

The single FIG. of the drawing is a schematic representation of an electron microscope and the focus analyzer of this invention.

DETAILED DESCRIPTION

The drawing shows a voltage source 11 supplying an accelerating potential to an electron source or gun 12 of an electron microscope 101. The gun 12 directs a stream of electrons 13 through the remaining elements, including condenser lens 14, specimen chamber 15, objective lens 16, projector lens 17, and viewing and recording chamber 18. A current source 19 supplies current to the objective lens 16. The electron microscope 101 is enclosed in a vacuum chamber which is not shown. Either a change in the voltage level to gun 12 or a change in the current to objective lens 16 will cause a shift in focal point 20 and a resulting change in the image in the recording chamber 18.

Adjacent the electron microscope 101, and advantageously but not necessarily located in a different vacuum chamber is a focus analyzer 102. The voltage source 11 also supplies the accelerating potential to the gun 21 of the focus analyzer 102 in parallel with the gun 12 of the electron microscope 101. The analyzing lens 22 of the focus analyzer 102 is energized by the same current as the objective lens 16. This may advantageously be done by putting the analyzing lens 22 in series with the objective lens 16 as shown in the FIG. Analyzing lens 22 matches objective lens 16 as to the first order relations between focal length, electron voltage, and lens current. Thus any change in focal length of lens 16 is accompanied by an identical change in lens 22.

During normal operating conditions, the focal point 32 of lens 22 lies between the lens 22 and a target 24. Lens 22 and target 24 are separated by a low thermal expansion spacer 23, thus any change in focal length of lens 22 results in an equal but opposite change in the distance between focal point 32 and target 24. Spacer 23 might advantageously be made from fused quartz with a coefficient of expansion of 4 parts in $10^7$ per degree centigrade.

Target 24 has two holes or slits 25 and 26 which are projected onto a detector plate 27. The magnification of the target, i.e., the ratio of the distance between holes 25 and 26 projected on plate 27 to the distance between holes 25 and 26 at target 24, equals the ratio of the distance between target 24 and plate 27 to the distance between target 24 and point 32. Thus any shift in point 32 resulting from a shift in focal length of lens 22 appears as a magnified shift at the detector plate 27. The magnification is increased by reducing the distance between the focal point 32 and the target 24.

The precise locations of projected holes 25 and 26 on plate 27 are detected by diode detectors 28, 29, 30 and 31. If the focal length of lens 22 increases, point 32 will shift closer to target 24 producing an increase in the signals detected by detectors 28 and 31 and a decrease in the signals detected by detectors 29 and 30. Conversely, a decrease in focal length will produce a signal decrease in detectors 28 and 31 and an increase in detectors 29 and 30. Signals from detectors 29 and 30 and detectors 28 and 31 are combined by adders 33 and 34, respectively. Subtractor 35 produces a difference signal from the outputs of adders 33 and 34 which is proportional to the change in focal length of lens 22 or the shift in focal point 32. The maintenance of a stable focus would result in a constant level signal from subtractor 35.

The signal from subtractor 35 is coupled to an appropriate control or feedback system 36 which utilizes the signal to generate compensating control signals for either the current source 19 or the voltage source 11 or both. Any appropriate feedback apparatus of proper sensitivity could be used. Such apparatus is commercially available. Likewise commercially available apparatus could be used for adders 33 and 34 and subtractor 35.

Integrated circuit diodes of minimum size should be utilized for diode detectors 28, 29, 30 and 31. Such diodes would permit maximum sensitivity to a change in focal length by the close physical spacings which would be possible. For focus stability of 1 part in $10^6$, diodes capable of detecting changes in locations of projected holes 25 and 26 on the order of 10 micrometers are required. Such diodes are available commercially.

The use of two holes 25 and 26 in target 24 and the particular method of combining the outputs from detectors 28, 29, 30 and 31 eliminates, or at least minimizes, a major problem caused by electron beam contamination. This contamination takes the form of a layer growing on bombarded surfaces. The holes 25 and 26 will tend to become smaller but the distance between their centers will remain the same. Thus equal changes in signal level will be reflected in adders 33 and 34, and the output signal from subtractor 35 will not change.

Signal level changes resulting from slight traversing of the electron image on plate 27 are likewise eliminated from the signal output from subtractor 35.

Another embodiment of this invention would utilize a series of analyzing lenses instead of the single analyzing lens 22. These lenses would be matched with objective lens 16 and would also be connected in series therewith just as lens 22 in the foregoing description. Such a cascaded arrangement of lenses would result in a much greater magnification of any variation in focal length, thereby increasing the sensitivity of the focus analyzer or monitor.

It is to be understood that the embodiments described herein are merely illustrative of the principles of the invention. Various modifications thereto may be made by persons skilled in the art without departing from the spirit and scope of the invention. In particular, the invention is not restricted for use in electron microscopes, but may find application in other charged particle systems where it is desired to monitor and stabilize the focus of charged particles.

I claim:

1. A focus monitor for a particle beam microscope having a particle source and an objective lens comprising, in combination:
   an auxiliary particle source;
   at least one analyzing lens for focusing particles from said auxiliary particle source, said analyzing lens having characteristics matched with the characteristics of said objective lens with respect to the relationship between focal length, lens current, and particle voltage, said analyzing lens being connected in series with said objective lens such that the focal length of each of said lenses is equally affected by any change in current therethrough;
   means for measuring changes in focal length of said analyzing lenses, said measuring means including target means illuminated by said particles from said auxiliary particle source and having an image thereof formed, said image having dimensional variations proportional to said changes in focal length, and detector means for detecting said dimensional variations and deriving signals therefrom; and
   control means for utilizing said signals to control said focus.

2. Apparatus in accordance with claim 1 wherein said target means comprises a plate having a plurality of holes therein, said image comprises projections of said holes upon said detector means, and said dimensional variations are detected by movement of said projections upon said detector means.

3. Apparatus in accordance with claim 1 wherein said detector means comprises a plurality of particle sensitive devices upon which said image is projected, each of said devices generating an output proportional to the portion of said image projected thereon, and circuit means for combining said outputs to indicate dimensional variations of said image.

4. Apparatus in accordance with claim 3 wherein each of said devices comprises a diode.

5. Apparatus in accordance with claim 1 including a spacer of material having a low thermal expansion connecting said target means and said analyzing lenses such that any change in focal length of said analyzing lens results in said dimensional variations.

6. Apparatus in accordance with claim 5 wherein said material is fused quartz.

7. Apparatus in accordance with claim 1 wherein said particle source and said auxiliary particle source are connected in parallel to a common voltage source such that each of said particle sources has the same particle voltage.

8. Apparatus in accordance with claim 1 wherein said control means utilizes said signals for controlling the current to said objective lens and said analyzing lens.

9. Apparatus in accordance with claim 1 wherein said control means utilizes said signals for controlling the voltage of said particle source and said auxiliary particle source.

10. Apparatus in accordance with claim 1 including a plurality of analyzing lenses, each of said lenses having characteristics matched with the characteristics of said objective lens with respect to the relationship between focal length, lens current and particle voltage, said lenses being connected in series such that changes in focal lengths can be detected with increased sensitivity.